United States Patent
Kurioka

(10) Patent No.: US 7,374,291 B2
(45) Date of Patent: May 20, 2008

(54) PROJECTION OPTICAL SYSTEM AND IMAGE DISPLAY APPARATUS USING SAME

(75) Inventor: Yoshiaki Kurioka, Moriguchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 258 days.

(21) Appl. No.: 11/139,405

(22) Filed: May 27, 2005

(65) Prior Publication Data

US 2005/0280778 A1    Dec. 22, 2005

(30) Foreign Application Priority Data

Jun. 17, 2004    (JP)    ............................. 2004-179932

(51) Int. Cl.
*G03B 21/28*    (2006.01)
*H04N 3/23*    (2006.01)

(52) U.S. Cl. ..................... 353/99; 353/77; 353/122; 348/745

(58) Field of Classification Search ................ 353/33, 353/34, 37, 73, 77, 78, 98, 99, 20, 119, 122; 349/9, 57, 62; 348/745
See application file for complete search history.

(56) References Cited

U.S. PATENT DOCUMENTS

| | | | |
|---|---|---|---|
| 5,309,276 A | * | 5/1994 | Rodgers ...................... 359/366 |
| 6,183,091 B1 | | 2/2001 | Johnson |
| 6,626,541 B2 | * | 9/2003 | Sunaga ......................... 353/69 |
| 6,905,211 B2 | * | 6/2005 | Fujita et al. ................... 353/20 |
| 7,130,114 B2 | * | 10/2006 | Kurioka ....................... 359/365 |
| 2002/0027619 A1 | * | 3/2002 | Robinson et al. .............. 349/9 |
| 2002/0044263 A1 | * | 4/2002 | Takeuchi ...................... 353/69 |
| 2004/0027544 A1 | * | 2/2004 | Chatani et al. ............... 353/37 |
| 2004/0196568 A1 | * | 10/2004 | Matsuo ........................ 359/649 |

FOREIGN PATENT DOCUMENTS

| | | | |
|---|---|---|---|
| JP | 2000-098322 A | | 4/2000 |
| JP | 2000-235168 A | | 8/2000 |
| JP | 2003-057600 A | | 2/2003 |
| JP | 2003-066373 A | | 3/2003 |
| JP | 2003-075769 A | | 3/2003 |
| JP | 2003-121811 A | | 4/2003 |

* cited by examiner

*Primary Examiner*—Andrew T Sever
(74) *Attorney, Agent, or Firm*—Canon U.S.A. Inc., IP Division

(57) ABSTRACT

An image display apparatus is provided, which includes a first image display element corresponding to a first color light, a second display element corresponding to a second color light different from the first color light, and a projection optical system having at least one reflective surface and projecting image lights from the first and second display elements onto a projection plane.

4 Claims, 6 Drawing Sheets

REFLECTANCE OF ALUMINUM MIRROR HAVING REFLECTANCE-INCREASING COATING

PROJECTION OPTICAL SYSTEM AND IMAGE DISPLAY APPARATUS USING SAME

BACKGROUND OF THE INVENTION

1. Field of the Invention

The present invention generally relates to a projection optical system and an image display apparatus.

2. Description of the Related Art

In projection display apparatuses using liquid crystal panels, three liquid crystal panels for red, green, and blue images are illuminated with linearly polarized lights of three wavelength regions of red, green, and blue, respectively. Polarization directions of the lights of three wavelength regions are individually controlled by the liquid crystal panels. An analyzer passes linearly polarized lights having a particular polarization direction and blocks linearly polarized lights having a polarization direction perpendicular to the particular polarization direction. Next, light beams passing through the analyzer are mixed in a color mixing (combining) system and generate an image light. The generated image light is projected onto a screen by a projection optical system.

When entering a color mixing system (e.g., a cross dichroic prism), a light of one wavelength range is an S-polarized light, and a light of another wavelength range is a P-polarized right. That is to say, when the mixed image light enters the projection optical system, linearly polarized light beams of three wavelength regions have different polarization directions.

If light beams of three wavelength regions having different polarization directions enter a projection optical system including reflective optical elements, the white balance on the screen is off, because reflectance of the reflective optical elements varies according to the polarization direction, and therefore transmittance of the projection optical system (reflectance of the reflective optical elements) varies according to the wavelength range.

In order to avoid this, a quarter-wave plate is disposed at the entrance of a projection optical system to reduce the difference in transmittance of the projection optical system between the wavelength ranges.

Japanese Patent Laid-Open No. 2003-121811 discloses a liquid crystal projector in which a quarter-wave plate is disposed between the entrance surface of an image projection lens and the exit surface of a cross dichroic prism for mixing images of three liquid crystal panels in order to convert three-color linearly polarized components into circularly polarized lights or elliptically polarized lights.

The related art disclosed in Japanese Patent Laid-Open No. 2000-235168 eliminates the difference in transmittance and reflectance between image lights output from a liquid crystal projector and having different polarized components, and the difference in transmittance between linearly polarized lights caused by the difference in angle of incidence, and provides a uniformly colored screen. A phase delay plate (quarter-wave plate) is disposed between a color mixing prism and a screen. The plate changes the polarization direction of image lights entering a projection optical system.

In conventional liquid crystal projectors, color lights have different polarization directions in order to enhance the effect of a dichroic prism. Therefore, a polarizing screen can reflect only the light having one of two polarization directions. Therefore, if such liquid crystal projectors use a polarizing screen, one or two color lights are not reflected, and therefore, for example, a green image is displayed, or a magenta (red plus blue) image is displayed. To solve this problem, Japanese Patent Laid-Open No. 2000-098322 discloses a liquid crystal projector including three LCD elements, a dichroic prism, and a projection lens. The LCD elements output linearly polarized lights. The prism mixes three color image lights output from the LCD elements. The projection lens magnifies and projects the mixed image lights. One of the three color lights has a polarization direction perpendicular to those of the other color lights. A quarter-wave plate is disposed on the exit side of the prism.

U.S. Pat. No. 6,183,091, and Japanese Patent Laid-Open Nos. 2003-057600, 2003-066373, and 2003-075769 disclose related arts in which a wavelength-selective half-wave plate is provided on the entrance side of a projection optical system to make all of the image lights entering the projection optical system have the same polarization direction.

In Japanese Patent Laid-Open Nos. 2003-121811, 2000-235168, and 2000-098322, light beams entering a projection optical system are circularly polarized lights. Therefore, when a reference axis ray is defined as a ray passing through the center of a display element, the center of a diaphragm, and the center of a screen, the reference axis ray includes an S-polarized component and a P-polarized component with respect to the plane of incidence on an optical reflective surface. In a reflective surface, reflectance of a P-polarized light is lower than that of an S-polarized light. Therefore, when a circularly polarized light enters a projection optical system including a reflective surface, loss of light quantity occurs. This is the same with lights other than the reference axis ray. Since they include a P-polarized component, reflectance deteriorates. Therefore, loss of the total quantity of light increases.

In U.S. Pat. No. 6,183,091, and Japanese Patent Laid-Open Nos. 2003-057600, 2003-066373, and 2003-075769, all of the image lights entering a projection optical system have the same polarization direction. However, a projection optical system including reflective surfaces is not discussed in these documents. If a projection optical system includes reflective surfaces and P-polarized lights are incident on the reflective surfaces, reflectance deteriorates.

SUMMARY OF THE INVENTION

In at least one exemplary embodiment, an image display apparatus includes a first image display element corresponding to a first color light, a second display element corresponding to a second color light different from the first color light, and a projection optical system having at least one reflective surface and projecting image lights from the first and second display elements onto a projection plane. In at least one exemplary embodiment, the reference axis ray can be defined as the principal ray of a light beam passing through the center of an original image formed by the first image display element and the center of image projected onto the projection plane, a ray of the first color light and a ray of the second color light traveling along the optical path of the reference axis ray are incident on the at least one reflective surface as substantially S-polarized lights.

In at least one further exemplary embodiment, an image display apparatus includes a red LCD element for red color, a green LCD element for green color, a blue LCD element for blue color, a color mixing optical system for mixing lights from the red, green, and blue LCD elements, and a projection optical system having at least one reflective surface for projecting a light going out of the color mixing optical system onto a projection plane. In at least one exemplary embodiment, light going out of the green LCD element and traveling along the optical path of the reference axis ray is incident on the at least one reflective surface as a substantially S-polarized light, where the reference axis ray is defined as the principal ray of a light beam passing through the center of image formed by the LCD elements and the center of image projected by the projection optical system onto the projection plane.

In yet at least one other exemplary embodiment, a projection optical system projects light from a first LCD element onto a projection plane. The system includes at least one reflective surface. In at least one exemplary embodiment, a ray going out of the first LCD element and traveling along the optical path of the reference axis ray is incident on the at least one reflective surface as a substantially S-polarized light, where the reference axis ray is defined as the principal ray of a light beam passing through the center of an original image formed by the first LCD element and the center of image projected onto the projection plane.

In at least one exemplary embodiment, a projection optical system projects mixed rays of a plurality of linearly polarized lights of different colors onto a projection plane. The system includes at least one reflective surface. The rays of the plurality of linearly polarized lights of different colors are incident on more than half of the at least one reflective surface as substantially S-polarized lights.

Further features of exemplary embodiments will become apparent from the following description of examples of at least a few exemplary embodiments (with reference to the attached drawings).

DESCRIPTION OF THE EMBODIMENTS

Figure 1:
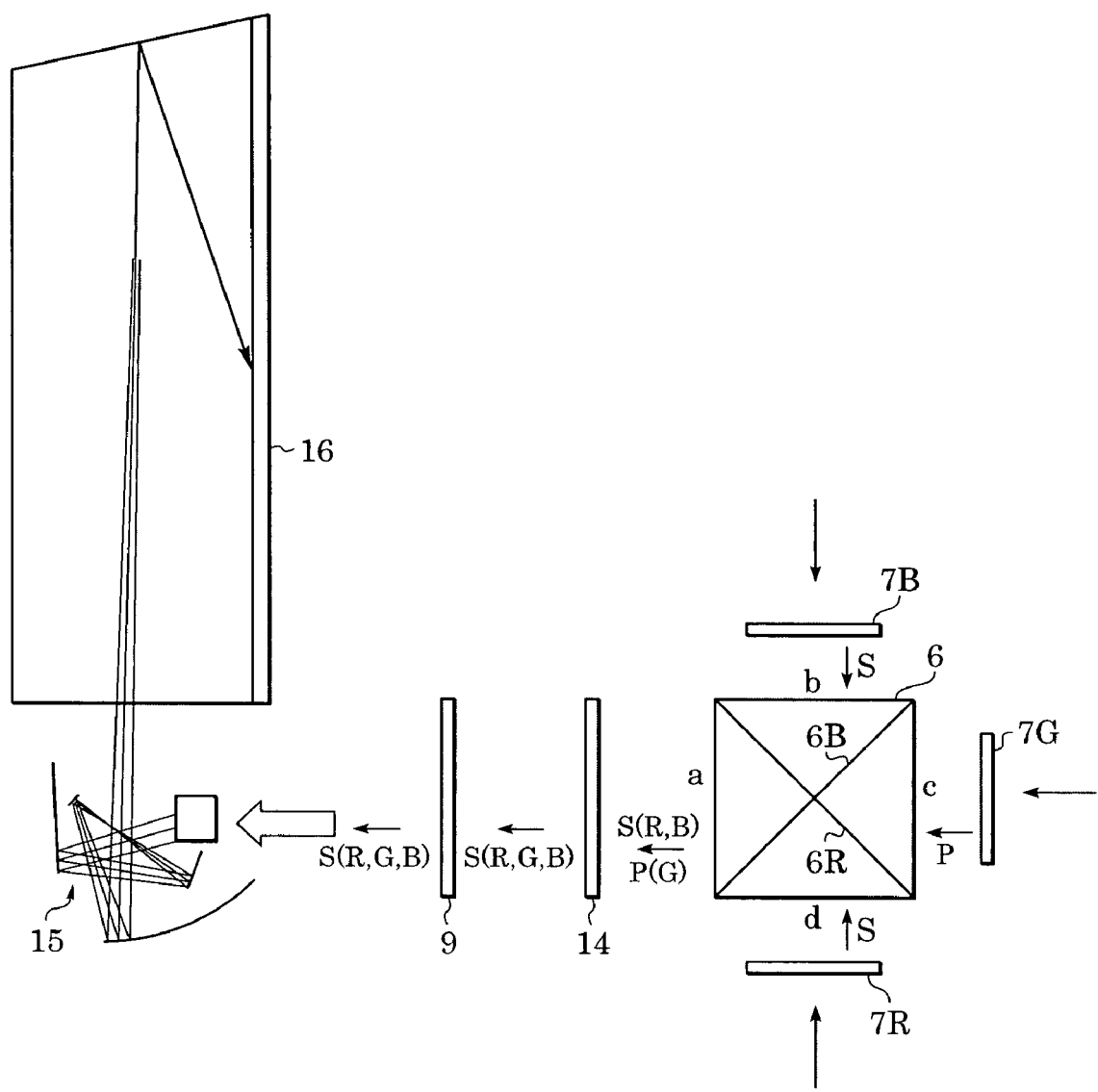
FIG. 1 illustrates the optical paths of a rear projection display apparatus in accordance with at least one exemplary embodiment.

The following description of at least one exemplary embodiment is merely illustrative in nature and is in no way intended to limit the invention, its application, or uses.

Processes, techniques, apparatus, and materials as known by one of ordinary skill in the art may not be discussed in detail but are intended to be part of the enabling description where appropriate. For example optical display systems are discussed and any material that can be used to form elements of optical displays should fall within the scope of exemplary embodiments (e.g. glass, Si). Additionally the actual size of the elements of optical displays or other elements of exemplary embodiments may not be discussed, however any size from macro to micro and nano are intended to lie within the scope of exemplary embodiments (e.g., lenses with diameters of nanometer size, micro size, centimeter, and meter sizes). Additionally exemplary embodiments are not limited to visual optical systems, for example the system can be designed for use with infrared and other wavelength systems.

Examples of several exemplary embodiments are described below with reference to the accompanying drawings.

The reflectance of a reflective surface in a projection optical system depends on the direction in which light is polarized. Therefore, if an S-polarized red light, an S-polarized blue light, and a P-polarized green light are incident on a reflective surface, only the reflectance of the P-polarized green light deteriorates. Consequently, the white balance on a projection plane (e.g., a screen) is upset, and the quantity of reflected light decreases.

An image display element (e.g., pixels in a liquid crystal panel, LCD elements, and other light emitting or modifying display pixels or elements as known by one of ordinary skill in the relevant art) can output substantially linearly polarized light as an image light. Projection optical systems according to at least one exemplary embodiment receives light beams from such image display elements, magnifies them and projects them onto a projection plane (e.g., a screen) with improved qualities (e.g., efficiently and without losing the white balance). The projection optical systems according to at least one exemplary embodiment can include a reflective surface, and further exemplary embodiments can include a plurality of reflective surfaces.

A reference axis ray is defined as a light ray passing through the center of an image formed on the liquid crystal panel and the center of a pupil of the projection optical system; or a light ray passing through the center of an image displayed on the screen and the center of a pupil of the projection optical system; or a principal ray of a light beam passing through the center of an image formed on the liquid crystal panel and the center of an image displayed on the screen; or a light ray passing through the center of an image formed on the liquid crystal panel, the center of a pupil of the projection optical system, and the center of an image displayed on the screen.

In at least one exemplary embodiment the polarized direction of 90% or more (e.g., 95% or more) of all light beams entering the projection optical system can be substantially perpendicular to a plane defined by an incident optical path of the reference axis ray on a first reflective surface of the projection optical system and an output optical path of the reference axis ray from the first reflective surface (that is to say, the plane of incidence of the reference axis ray on the first reflective surface). Here, "perpendicular", of course, refers to "about 90 degrees", however, is not limited to exactly at 90 degrees (e.g., the angle may be at least 80 degrees no more than 100 degrees, and can be at least 87 degrees no more than 93 degrees, and can be at least 89 degrees no more than 91 degrees).

The projection optical systems of at least a few exemplary embodiments have at least one reflective surface. The angle of incidence of the reference axis ray on the reflective surface can vary (e.g., 15 degrees or more, 30 degrees or more, 40 degrees or more, 50 degrees or more). In at least one exemplary embodiment, the angles of incidence of the reference axis ray on half or more of the reflective surfaces can vary (e.g., 30 degrees or more). In at least one exemplary embodiment, the projection optical systems includes a plurality of reflective optical elements on which the reference axis ray is incident at 40 degrees or more. In yet another exemplary embodiment, an image light can be incident as a substantially S-polarized light especially on the reflective optical elements on which the reference axis ray is incident at a large angle.

Not all color lights in exemplary embodiments need to satisfy the above conditions. For example, if the green light, which has the highest luminous efficiency with respect to the human eye, satisfies conditions discussed above, the red light and the blue light need not satisfy the above conditions. However, in at least one exemplary embodiment, the green light and the red light satisfy the above conditions and the blue light does not satisfy the above conditions. Alternatively, in at least one exemplary embodiment, the green light and the blue light satisfy the above conditions and the red light does not satisfy the above conditions. In yet at least one further exemplary embodiment, all the three color lights (red, green, and blue) satisfy the above conditions.

The image light need not be an S-polarized light with respect to all reflective surfaces in the projection optical system. The image light may be an S-polarized light with respect to more than half of the reflective surfaces in the projection optical system. In at least one exemplary embodiment, the image light is an S-polarized light with respect to all the reflective surfaces (especially all the reflective surfaces having optical power). In at least one exemplary embodiment, the image light is a substantially S-polarized light with respect to more than half of the reflective surfaces in the projection optical system, especially with respect to more than half of the reflective surfaces having optical power in the projection optical system.

Examples of at least a few exemplary embodiments will now be described in detail with reference to the drawings.

Embodiment 1

Embodiment 1 as at least one exemplary embodiment will be described with reference to FIG. 1. FIG. 1 illustrates the optical paths of a rear projection display apparatus. Of course, a projection display apparatus of this embodiment may be a front projection type. The projection display apparatus includes a red LCD element 7R, a blue LCD element 7B, and a green LCD element 7G. The LCD elements 7R, 7B, and 7G are transmissive LCD elements. Of course, they may be reflective LCD elements. The transmissive LCD element (e.g., 7R, 7G, 7B) selectively give an illumination light a phase difference of substantially 90 degrees to modulate the illumination light in each pixel. Only a component in a predetermined polarized direction of this modulated light beam is led to a projection optical system by a polarizing plate 9, the other components are blocked. The polarizing plate 9 may be replaced with a polarization beam splitter. The light beam (image light) going out of this polarizing plate 9 is projected onto a projection plane (e.g., a screen 16).

In the embodiment shown, a color mixing system 6 (e.g., a cross dichroic prism) having color separating/mixing surfaces (e.g., two dichroic surfaces 6B and 6R) is used. In this example, a cross dichroic prism, reflectance of an S-polarized light is increased more than that of a P-polarized light, and transmittance of an S-polarized light is lower than that of a P-polarized light. Although it may be possible to make a cross dichroic prism having inverse characteristics (at least a few exemplary embodiments can have this feature), the film configuration of a cross dichroic prism having the above characteristics is simpler. Blue light and red light, which are reflected by the cross dichroic prism 6, are S-polarized with respect to the dichroic surfaces (reflective surfaces) of the cross dichroic prism. Green light, which is transmitted by the cross dichroic prism, is P-polarized with respect to the dichroic surfaces (transmissive surfaces) of the cross dichroic prism. Such a configuration makes it possible to use light more efficiently in the cross dichroic prism 6.

In embodiment 1, lights illuminating the transmissive LCD elements 7R, 7G, and 7B may be polarized in any state. When they are incident on the cross dichroic prism, a color light transmitted by the cross dichroic prism (green light in embodiment 1) is P-polarized with respect to the dichroic surfaces of the cross dichroic prism, and color lights reflected by the cross dichroic prism (red light and blue light in embodiment 1) are S-polarized with respect to the dichroic surfaces of the cross dichroic prism. This makes it possible to make lights having different colors and different polarized directions enter the cross dichroic prism.

In the above-described display apparatus, when white is displayed on the entire screen, the components function as follows. S-polarized red and blue image lights are emitted from the red and blue LCD elements 7R and 7B, respectively. P-polarized green image light is emitted from the green LCD element 7G. The red and blue image lights are mixed with the green image light in the cross dichroic prism. Next, only the green light is rotated by 90 degrees in a wavelength-selective half-wave plate 14. At this time, all the three color lights (red, green, and blue) are S-polarized lights. The polarizing plate 9 transmits S-polarized light and blocks (absorbs, reflects, or scatters) P-polarized light. The polarizing plate 9 functions as an analyzer here. Only S-polarized lights are led to the projection optical system, and lights not constituting an image are blocked. In the case where white is displayed, the "lights not constituting an image" basically do not exist. In at least one exemplary embodiment, the wavelength-selective half-wave plate disposed between the color mixing system and the projection optical system gives phase difference such that all the three color lights (red, green, and blue) are S-polarized lights with respect to the reflective surfaces in the projection optical system (that is to say, perpendicular to a plane defined by the reference axis ray).

Figure 4:
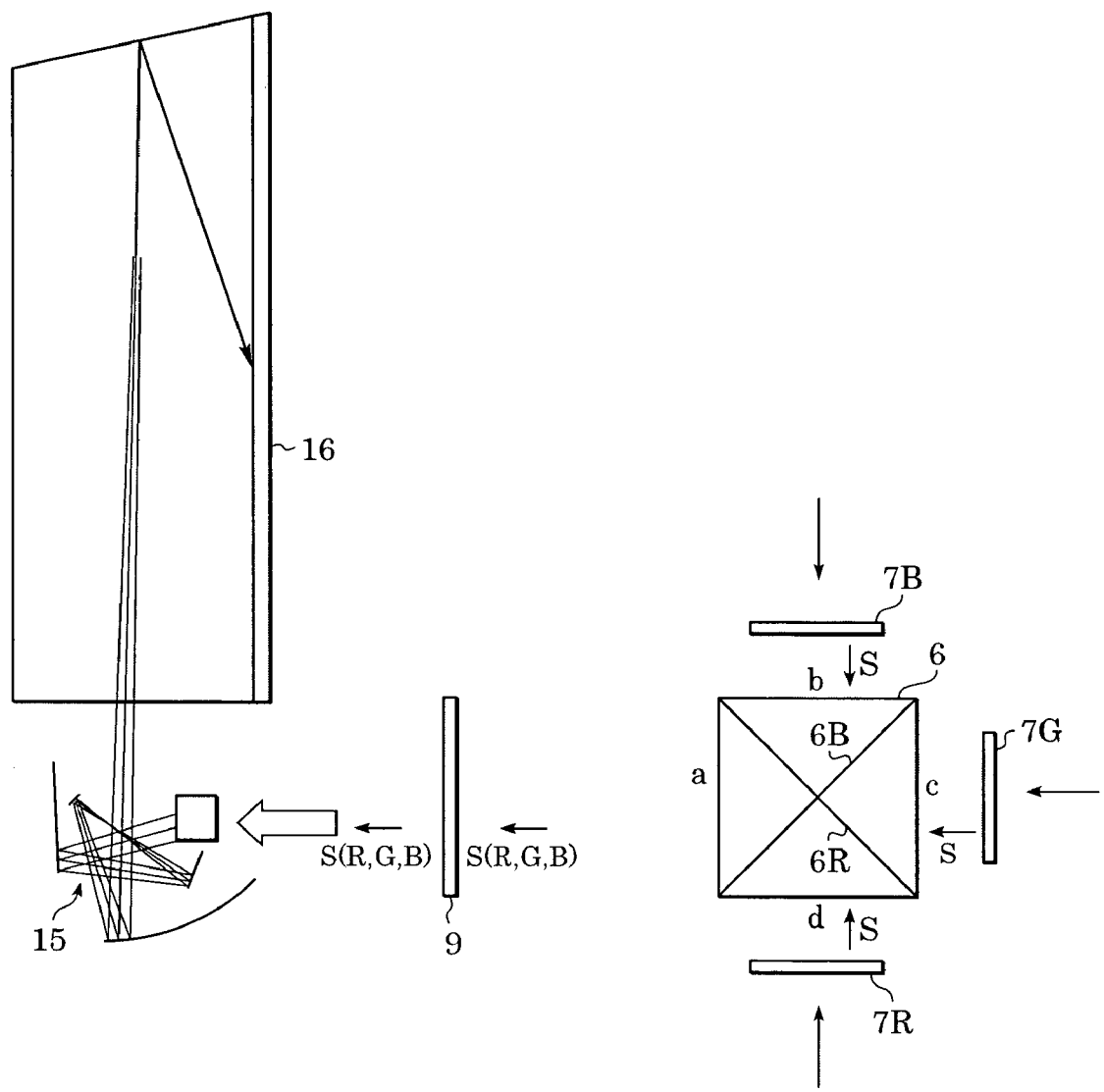
FIG. 4 illustrates a modification in accordance with embodiment 1 as at least one exemplary embodiment.
Figure 5A:
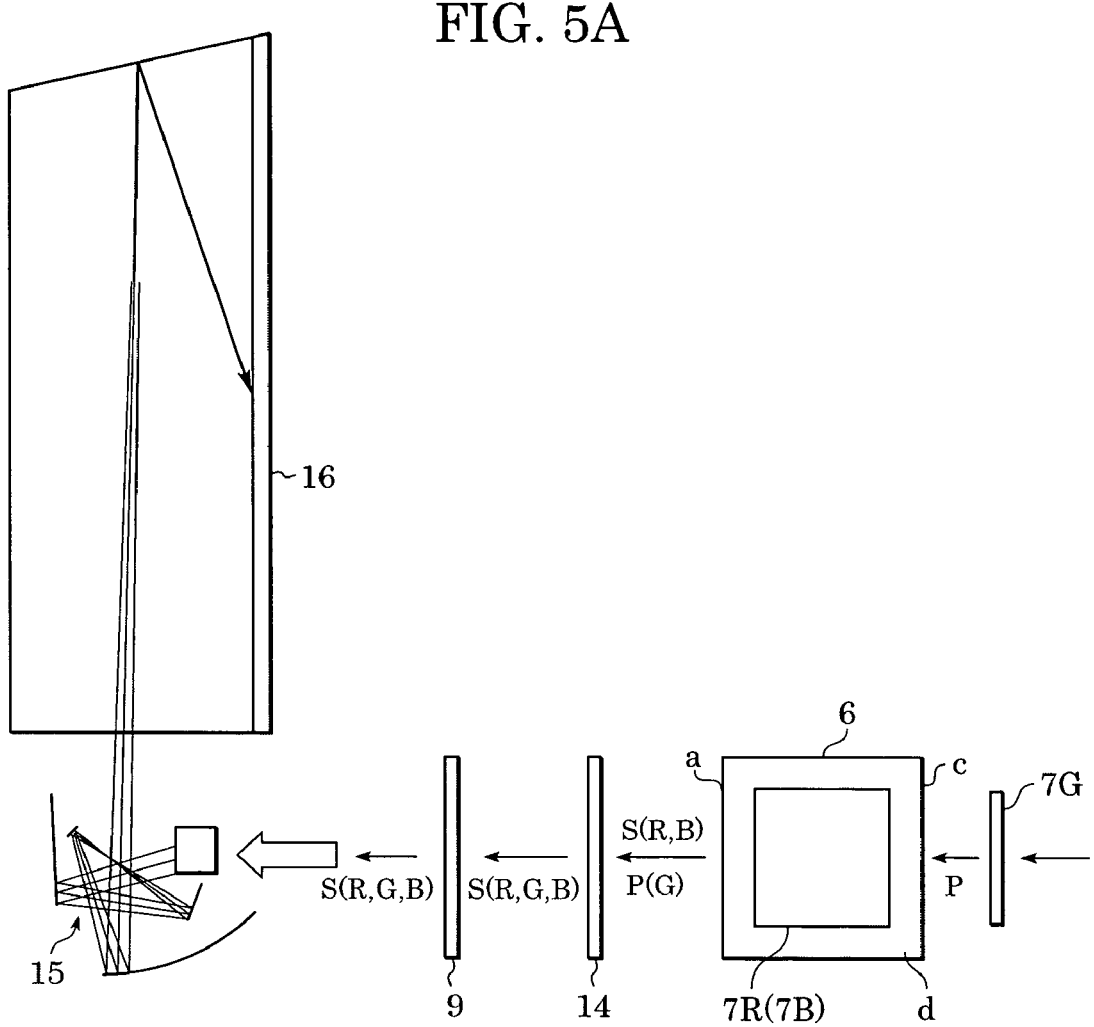
FIG. 5 illustrates a modification in accordance with embodiment 1 as at least one exemplary embodiment.
Figure 5B:
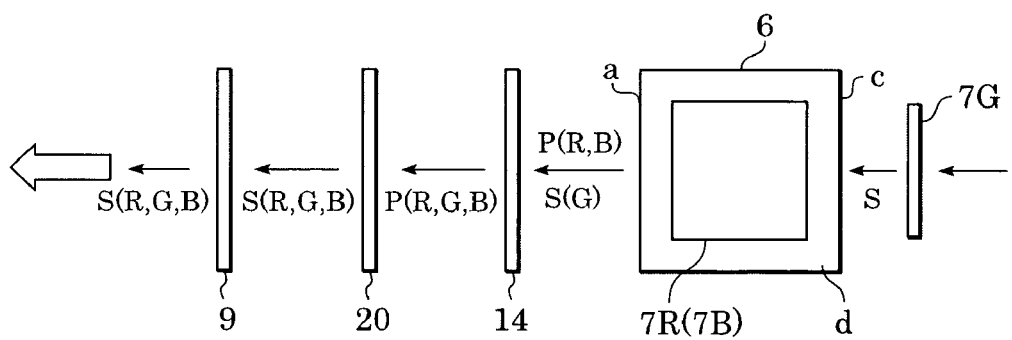

As a modification of this embodiment, a color mixing plane (a plane that is parallel to the optical paths of color lights before the color mixing and those after the color mixing, in other words, a plane parallel to paper in FIGS. 1 and 4) may be rotated by 90 degrees around the normal of the green LCD element 7G as illustrated in FIGS. 5A and 5B. That is to say, before the color mixing in the cross dichroic prism, this modification (in the case of FIG. 5A) is the same as embodiment 1, and after the color mixing, a wavelength-selective half-wave plate 14 converts all the three color lights into P-polarized lights with respect to the dichroic surfaces. In this case, the positional relation between the cross dichroic prism and the projection optical system is changed such that P-polarized lights with respect to the dichroic surfaces become S-polarized lights with respect to reflective surfaces in the projection optical system. In FIG. 1, when the color mixing plane is rotated by 90 degrees around the normal of the green LCD element 7G, P-polarized lights with respect to the dichroic surfaces become S-polarized lights with respect to reflective surfaces in the projection optical system. Alternatively, as illustrated in FIG. 5B, all the three color lights may be made to have the same polarization direction (P-polarization direction) by a wavelength-selective half-wave plate 14, and then converted into S-polarized lights by a half-wave plate 20.

As a second modification, a configuration not including a wavelength-selective half-wave plate will be described. FIG. 4 shows an example of the second modification of at least one exemplary embodiment. In the image display apparatus shown in FIG. 4, all the three color image lights (red, green, and blue) incident on the dichroic surfaces of the dichroic prism are S-polarized lights. After the color mixing, the polarization directions of the red, green, and blue image lights are S-polarized lights with respect to the reflective surfaces in the projection optical system. In this case, although the quantity of the image light passing through the dichroic surfaces (the green light, here) may slightly decrease, there is not large loss in the projection optical system.

Figure 6:
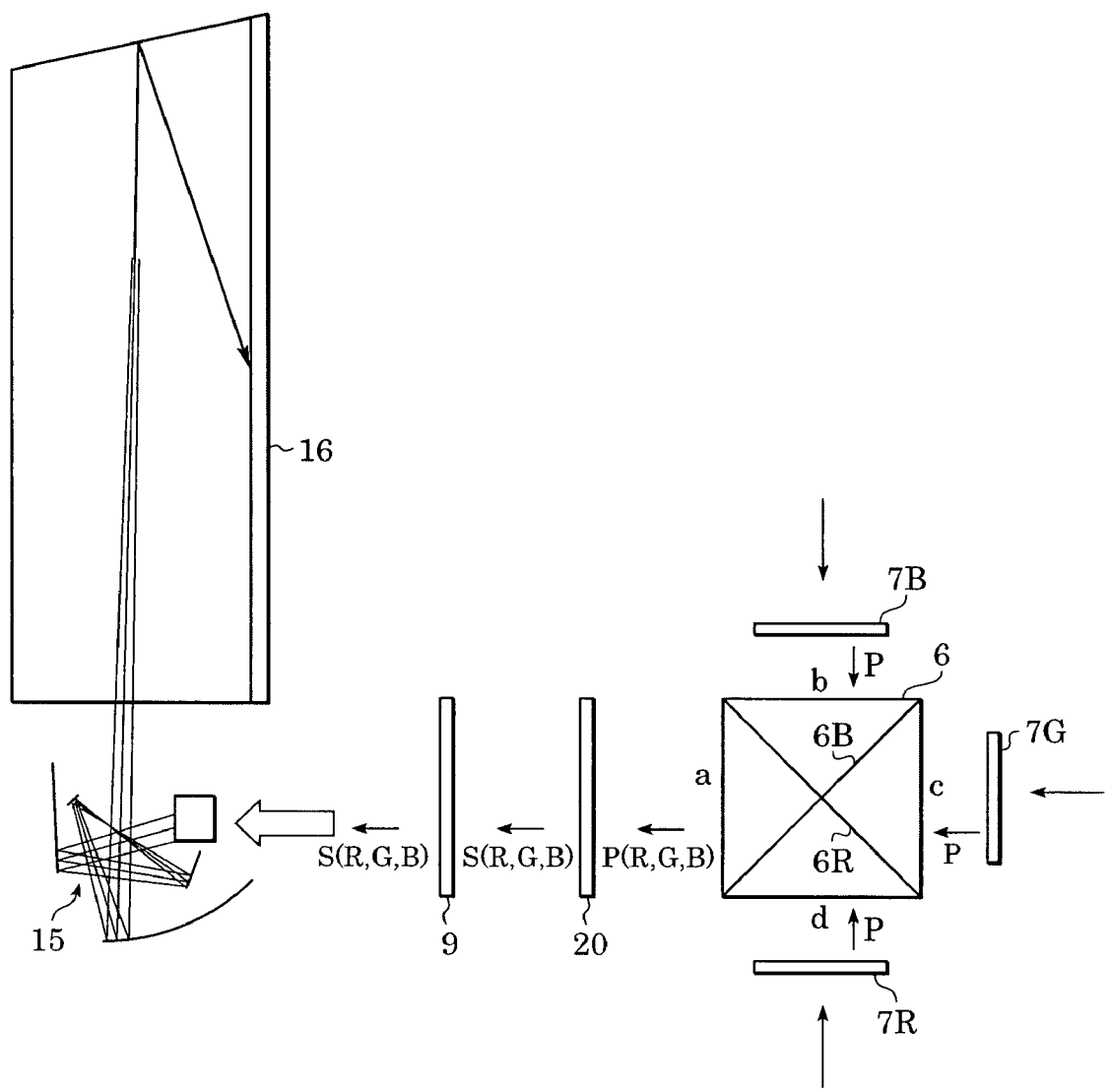
FIG. 6 illustrates a modification in accordance with embodiment 1 as at least one exemplary embodiment.

In yet another modification (illustrated in FIG. 6), all the three color image lights (red, green, and blue) incident on the dichroic surfaces may be P-polarized lights. In this case, a half-wave plate 20 acting on all the three color lights (red, green, and blue) is disposed between the cross dichroic prism and the projection optical system in order to make all the three color lights S-polarized with respect to the reflective surfaces of the projection optical system. Alternatively, instead of disposing such a half wave plate 20, a color mixing plane (a plane parallel to the optical paths of color lights before the color mixing and those after the color mixing, in other wards, a plane parallel to paper in FIGS. 1 and 4) may be rotated by 90 degrees. In FIG. 4, when the color mixing plane is rotated by 90 degrees around the normal of the green LCD element 7G, P-polarized lights with respect to the dichroic surfaces become S-polarized lights with respect to reflective surfaces in the projection optical system.

Here, the above-described plane defined by the reference axis ray (that is to say, the plane of incidence of the reference axis ray on a reflective surface in the projection optical system) can be coplanar (or parallel) to paper in FIG. 1. The polarization direction of 90% or more (e.g. 95% or more) of the light beams entering the projection optical system 15 is substantially perpendicular to the plane defined by the reference axis ray (or the plane of incidence of the reference axis ray on a reflective surface in the projection optical system). Here, "the light beams entering the projection optical system" refers to light beams incident on the first reflective surface or refractive surface in the projection optical system, in other words, light beams going out of the polarizing plate 9 (and incident on the next optical element).

In this way, the image light entering the projection optical system is magnified and projected onto a projection plane (e.g. screen 16).

Figure 2:
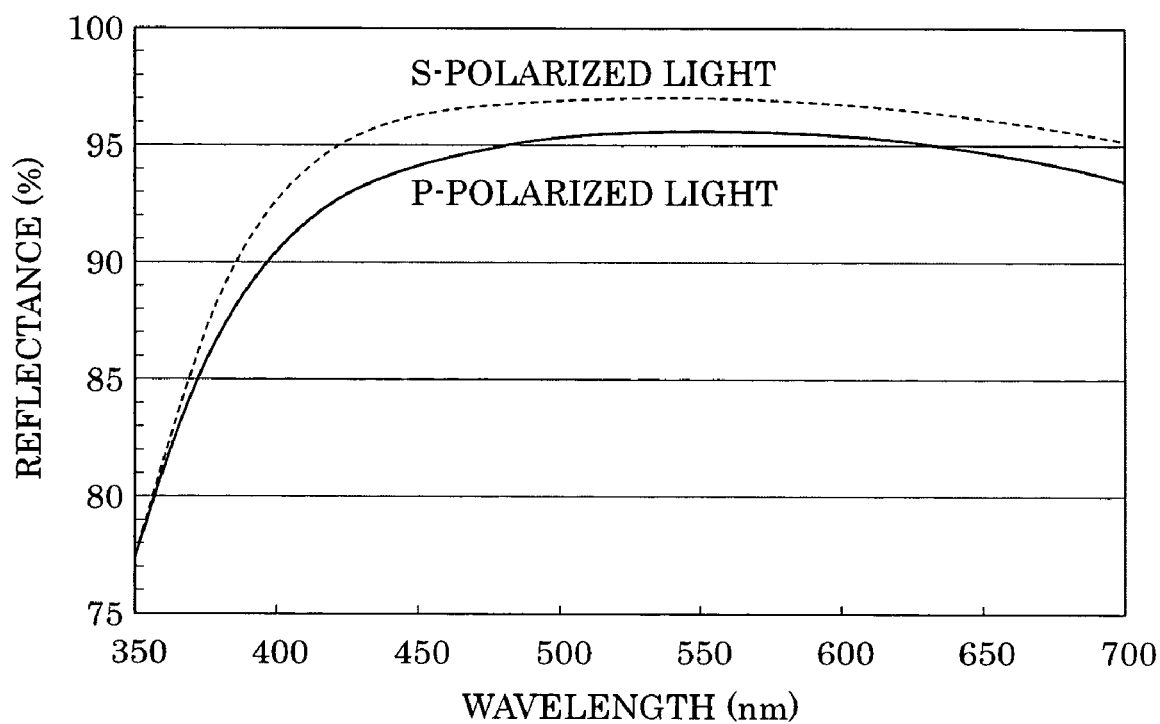
FIG. 2 illustrates the reflectance of S-polarized light and P-polarized light incident on an aluminum mirror having a reflectance-increasing coating (at an angle of incidence of 38 degrees).

FIG. 2 is a diagram illustrating the reflectance of S-polarized light and P-polarized light incident on an aluminum mirror having a reflectance-increasing coating at an angle of incidence of 38 degrees. Of course, the material of the mirror is not limited to aluminum. In addition, in at least one exemplary embodiment, the reflectance is at least 85% or 90%, the mirror need not have a reflectance-increasing coating. This diagram shows that when the angle of incidence is large, the reflectance is significant.

The projection optical system 15 of this embodiment can be a reflective optical system. In this reflective optical system, the reference axis ray is reflected as an S-polarized light. In the green wavelength region (550 nm) and its vicinity, reflectance of S-polarized light is 1.4% higher than that of P-polarized light. As described above, when polarized lights enter the projection optical system 15 such that the reference axis ray in the reflective optical system is an S-polarized light, four mirrors can reflect S-polarized light. Therefore, a larger quantity of light is obtained and a brighter image can be displayed on the screen compared to the case where P-polarized light enters the projection optical system.

In addition, since the image light is S-polarized light at all wavelengths, reflectance at the reflective optical elements is equalized, and the white balance of the image light passing through the projection optical system is improved.

Table 1 shows the angles of incident of the reference axis ray on the reflective surfaces in the reflective optical system of this embodiment. In at least one exemplary embodiment, the projection optical system includes at least one reflective surface on which the reference axis ray is variable (e.g., incident at an angle of 15 degrees or more). In at least one exemplary embodiment, the angle of incidence of the reference axis ray on more than half of the reflective optical elements of the projection optical system is 12 degrees or more. In at least one exemplary embodiment, the projection optical system includes three or more reflective optical elements on which the reference axis ray is incident at an angle of 12 degrees or more.

A polarizing plate 9 is disposed behind the wavelength-selective half-wave plate 14 in order to improve the contrast of image light. This polarizing plate 9 may be replaced with a polarization beam splitter.

In a rear projection display apparatus, plane mirrors are often used as light-folding mirrors in order to make the optical path compact. In plane mirrors, the reflectance of S-polarized light is more than that of P-polarized light as in reflective optical elements of the reflective optical system. Therefore, plane mirrors are disposed such that the reference axis ray is reflected in the same plane defined by the reference axis ray in the reflective optical system.

Depending on combination of mirrors, it could be that the reference axis ray is incident on a plurality of mirrors as a S-polarized light, and is incident on the other mirrors as a P-polarized light. In this case, in order to increase the quantity of light, the reflective optical system is configured such that the number of reflective surfaces on which the reference axis ray is incident as an S-polarized light is the same as, although in at least one exemplary embodiment it can be more than, the number of reflective surfaces on which the reference axis ray is incident as a P-polarized light. If the reference axis ray is incident on every reflective surface as an S-polarized light by disposing a half-wave plate at the middle of the reflective optical system (for example, between the first reflective surface and the second reflective surface), a half-wave plate (not shown) may be disposed at the middle of the reflective optical system.

The display elements 7A, 7B, and 7C may be transmissive LCD elements as in the embodiment, and alternatively, of course, they may be reflective LCD elements. The display elements are not limited to LCD elements. Anything capable of giving phase difference on a pixel-by-pixel basis will do.

The projection optical system 15 may be hollow type, solid type, or partly hollow and partly solid. In the case where the projection optical system 15 is composed of hollow mirrors, in order to reduce dust from being attached on the reflective surfaces, the reflective optical elements or the whole reflective optical system has a closed structure. If the entrance/exit for image light is covered with a thin plane glass, dust accumulates on the glass and can be easily removed. Of course, the plane glass may have refractive power.

TABLE 1

Angles of incidence of the reference axis ray on the reflective optical elements in embodiment 1

| Number of reflective optical element | Angle of incidence (degrees) |
| --- | --- |
| First reflective optical element | 13 |
| Second reflective optical element | 13 |
| Third reflective optical element | 18 |
| Fourth reflective optical element | 10 |

Embodiment 2

Figure 3:
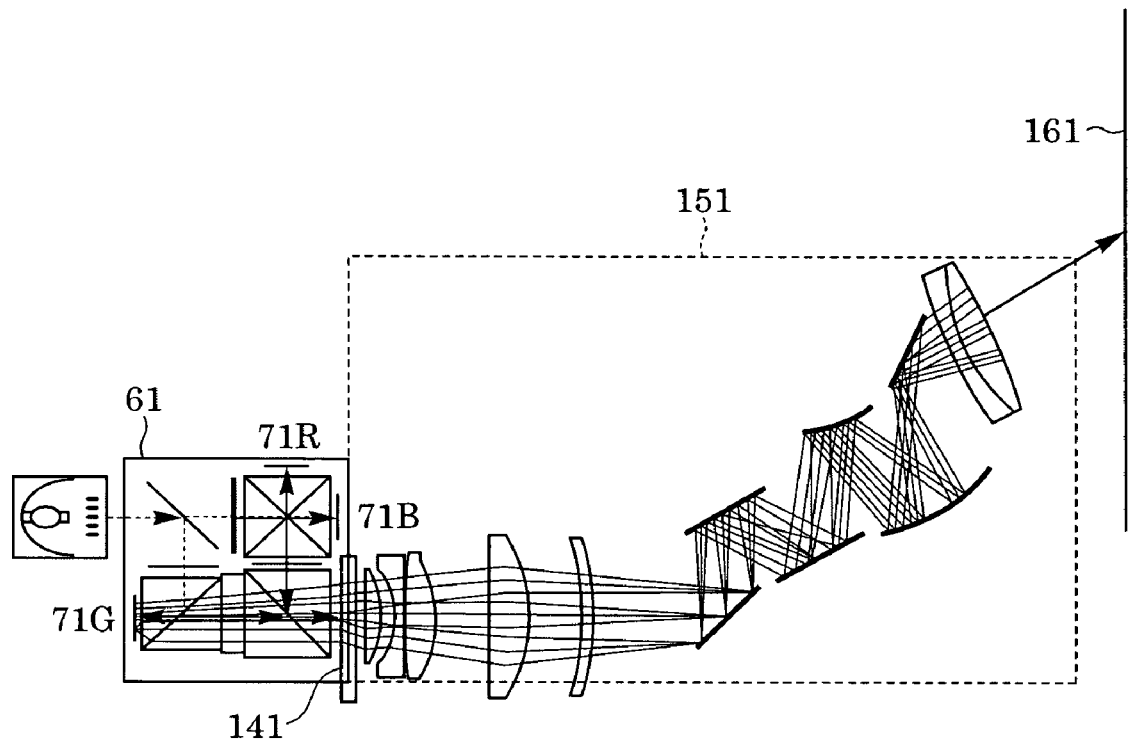
FIG. 3 illustrates an optical system of a front projector having reflective optical elements in accordance with at least one exemplary embodiment.

FIG. 3 is an overall view of an optical system of a front projector according to embodiment 2 as at least one exemplary embodiment, the projector having reflective optical elements. In embodiment 2, the description of the same components as those in embodiment 1 will be omitted.

FIG. 3 illustrates a sectional view of optical paths of an optical system of the front projector. In this embodiment, a red beam, a green beam, and a blue beam are output from reflective LCD elements 71R, 71G, and 71B, respectively, and are incident on a wavelength-selective half-wave plate 141 via a color separating/mixing system 61. Of course, the LCD elements may be transmissive type. The separating/mixing system 61 can includes a polarizing beam splitter (PBS) functioning as a color mixing system and an analyzer.

When light leaves the separating/mixing system 61, the green light is a P-polarized light with respect to the separating/mixing system 61 (especially to the color mixing plane), and the red and blue lights are S-polarized lights with respect to the color mixing system 61. Therefore, the wavelength-selective half-wave plate 141 rotates only the polarization direction of the green beam by 90 degrees, thereby all the three color lights have the same polarization direction. Here, the polarization direction of the green light is rotated by 90 degrees, and the polarization directions of the red and blue lights are not changed. The polarization directions of the color lights depend on how the color lights are mixed. Therefore, the color light whose polarization direction is rotated by the wavelength-selective half-wave plate by 90 degrees is not limited to the green light, and may be the blue light or the red light.

Alternatively, any two color lights may be rotated. In this way, the lights going out of the separating/mixing system 61 and passing through the wavelength-selective half-wave plate 141 are led to a projection optical system 151. Of course, the polarization directions of the red light, the green light, and the blue light are not limited to these. Any configurations will do. In at least one exemplary embodiment, the wavelength-selective half-wave plate 141 is disposed between the color mixing system 61 and the projection optical system 151, and the plate makes all the three color lights (red, green, and blue) S-polarized with respect to the reflective surfaces in the projection optical system (that is to say, perpendicular to the plane defined by the reference axis ray). In embodiment 2, the projection optical system 151 is composed of a plurality of refractive optical elements and a plurality of reflective optical elements. Therefore, the wavelength-selective half-wave plate 14 may be disposed between the refractive optical elements, or between a refractive optical element and a reflective optical element. If, due to the configuration of the color mixing system, the mixed color lights are S-polarized with respect to the reflective surfaces in the projection optical system, no wavelength-selective half-wave plate is needed. Alternatively, a half-wave plate may be disposed on the screen side of the wavelength-selective half-wave plate.

By the above configurations, S-polarized image lights enter a reflective optical system. In the projection optical system 151 (e.g., a reflective optical system), the plane defined by the reference axis ray in the reflective optical system is perpendicular to the polarization direction of the linearly polarized image lights.

Therefore, as in embodiment 1, an increased reflectance is obtained in the reflective optical elements. Therefore, an image with a large quantity of light and a good white balance is obtained on the screen 161.

Table 2 shows the angles of incident of the reference axis ray on the reflective optical elements of this embodiment. In at least one exemplary embodiment, the projection optical system has at least one reflective surface on which the reference axis ray is incident at an angle of 40 degrees or more (e.g., 50 degrees or more). In at least one exemplary embodiment, the projection optical system has a plurality of reflective surfaces on which the reference axis ray is incident at an angle of 40 degrees or more. In at least one exemplary embodiment, the angles of incidence of the reference axis ray on at least half (e.g., more than half) of the reflective optical elements in the projection optical system are 30 degrees or more. In at least one exemplary embodiment, the projection optical system has at least three reflective surfaces on which the reference axis ray is incident at an angle of 30 degrees or more.

At least one exemplary embodiment combines embodiments 1 and 2. In this particular embodiment, both embodiments 1 and 2 are consistent with each other. For example, as a projection optical system of embodiment 1, a projection optical system including refractive optical elements and reflective optical elements shown in embodiment 2 may be adopted.

The projection optical systems in embodiments 1 and 2 may have only a single reflective surface, and, of course, may have a plurality of reflective surfaces as described above. At least one exemplary embodiment can have substantially S-polarized lights incident on reflective surfaces (the polarization direction of the reference axis ray is perpendicular to the plane of incidence on a predetermined reflective surface). In the case where there is only one reflective surface, the polarization direction of the reference axis ray incident on the reflective surface can be perpendicular to the plane of incidence on the reflective surface. In the case where there is a plurality of reflective surfaces, the reference axis ray can be incident on a portion of the plurality of reflective surfaces (e.g., at least half, more than half, 80% or more, and all) as an S-polarized light (that is to say, the polarization direction of the reference axis ray can be perpendicular to the plane of incidence on the reflective surfaces).

The above embodiments are projection optical systems and projection display apparatuses. However, at least one exemplary embodiment may be applied to other optical systems (e.g., an imaging optical system or other optical apparatus, and optical systems using linearly polarized lights, equivalents and other optical system known by one of ordinary relevant art).

The projection optical systems according to at least one exemplary embodiment and projection display apparatuses using them, can have as at least one exemplary embodiment, projecting lights output from display elements (e.g., liquid crystal panels) illuminated with linearly polarized lights onto a projection plane (e.g., screen) with improved qualities (e.g., increased efficiently and without losing the white balance).

TABLE 2

Angles of incidence of the reference axis ray on the reflective optical elements in embodiment 2

| Number of reflective optical element or plane mirror | Angle of incidence (degrees) |
|---|---|
| First plane mirror | 44 |
| First reflective optical element | 31 |
| Second reflective optical element | 34 |
| Third reflective optical element | 25 |
| Fourth reflective optical element | 16 |
| Second plane mirror | 56 |

While the present invention has been described with reference to exemplary embodiments, it is to be understood that the invention is not limited to the disclosed exemplary embodiments. On the contrary, exemplary embodiments are intended to cover various modifications and equivalent arrangements included within the spirit and scope of the appended claims, specification, figures, and as known by one of ordinary relevant skill in the art. The scope of the following claims is to be accorded the broadest interpretation so as to encompass all such modifications and equivalent structures and functions.

This application claims priority from Japanese Patent Application No. 2004-179932 filed Jun. 17, 2004, which is hereby incorporated herein in its entirety.

What is claimed is:

1. An image display apparatus comprising:
a first image display element corresponding to a first color light;
a second display element corresponding to a second color light different from the first color light; and
a third image display element corresponding to a third color light different from the first and second color lights;
a projection optical system having four reflective surfaces with optical power, wherein the projection optical system projects first, second and third image lights received from the first, second and third display elements onto a projection plane; and
a mixing optical system, arranged between the first image display element and the projection optical system, between the second image display element and the projection optical system and between the third image display element and the projection optical system, having a dichroic prism for mixing the first, second and third image lights and a wavelength-selective half-wave plate for making them have a same polarization direction and a polarization plate for analyzing the image lights through the wavelength-selective half-wave plate, and guiding them to the projection optical system,
wherein, when a reference axis ray is defined as the principal ray of a light beam passing through the center of an original image formed by the first image display element and the center of image projected onto the projection plane, a ray of the first color light and axis ray of the second color light traveling along an optical path of the reference axis ray out of the first, second and third image lights is incident on the four reflective surfaces as substantially S-polarized light,
wherein the four reflective surfaces include, in order from the mixing optical system side, a first reflective surface, a second reflective surface, a third reflective surface, and a fourth reflective surface,
wherein an optical path from the optical system to the first reflective surface intersects an optical path from the second reflective surface to the third reflective surface and an optical path from the second reflective surface to the third reflective surface and an optical path from the fourth reflective surface to the projection plane, and
wherein an optical path from the first reflective surface to the second reflective surface intersects the optical path from the third reflective surface to the fourth reflective surface and the optical path from the fourth reflective surface to the projection plane.

2. The image display apparatus according to claim 1, wherein an incident angle of the reference axis ray to the first, second, third and fourth reflective surfaces are 13 degrees, 13 degrees, 18 degrees and 10 degrees, respectively.

3. An image display apparatus comprising:
a first image display element corresponding to a first color light;
a second image display element corresponding to a second color light different from the first color light;
a third image display element corresponding to a third color light different from the first and second color lights;
a projection optical system having six reflective surfaces with optical power, wherein the projection optical system projects first, second, and third image lights received from the first, second and third display elements onto a projection plane; and
a mixing optical system, arranged between the first image display element and the projection optical system, between the second image display element and the projection optical system, and between the third image display element and the projection optical system, having a plurality of polarization beam splitters for mixing the first, second and third image lights, and a wavelength-selective half-wave plate for making them have a same polarization direction and guiding them to the projection optical system,
wherein when a reference axis ray is defined as the principal ray of a light beam passing thigh the center of an original image formed by the first image display element and the center of image projected onto the projection plane, a ray traveling along an optical path of the reference axis ray out of the first, second and third image lights is incident on the six reflective surfaces as substantially S-polarized lights, and
wherein the projection optical system includes, in order from the mixing optical system side, a first positive lens, a second negative lens, a third positive lens, a fourth positive lens, a fifth meniscus lens, a first flat reflective surface, a second reflective surface, a third reflective surface, a fourth reflective surface, a fifth reflective surface, a sixth flat reflective surface, and a sixth bonded lens.

4. The image display apparatus according to claim 3, wherein an incident angle of the reference axis ray to the first, second, third, fourth, fifth and sixth reflective surfaces are 44 degrees, 31 degrees, 34 degrees, 25 degrees, 16 degrees and 56 degrees, respectively.

* * * * *